Jan. 14, 1930.  W. L. MORELAND  1,743,373
VEHICLE SPRING SUSPENSION
Filed Dec. 14, 1925
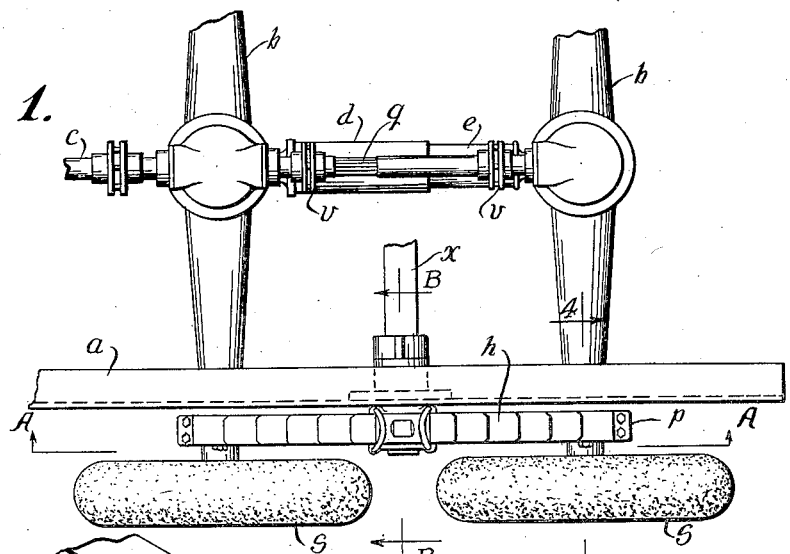
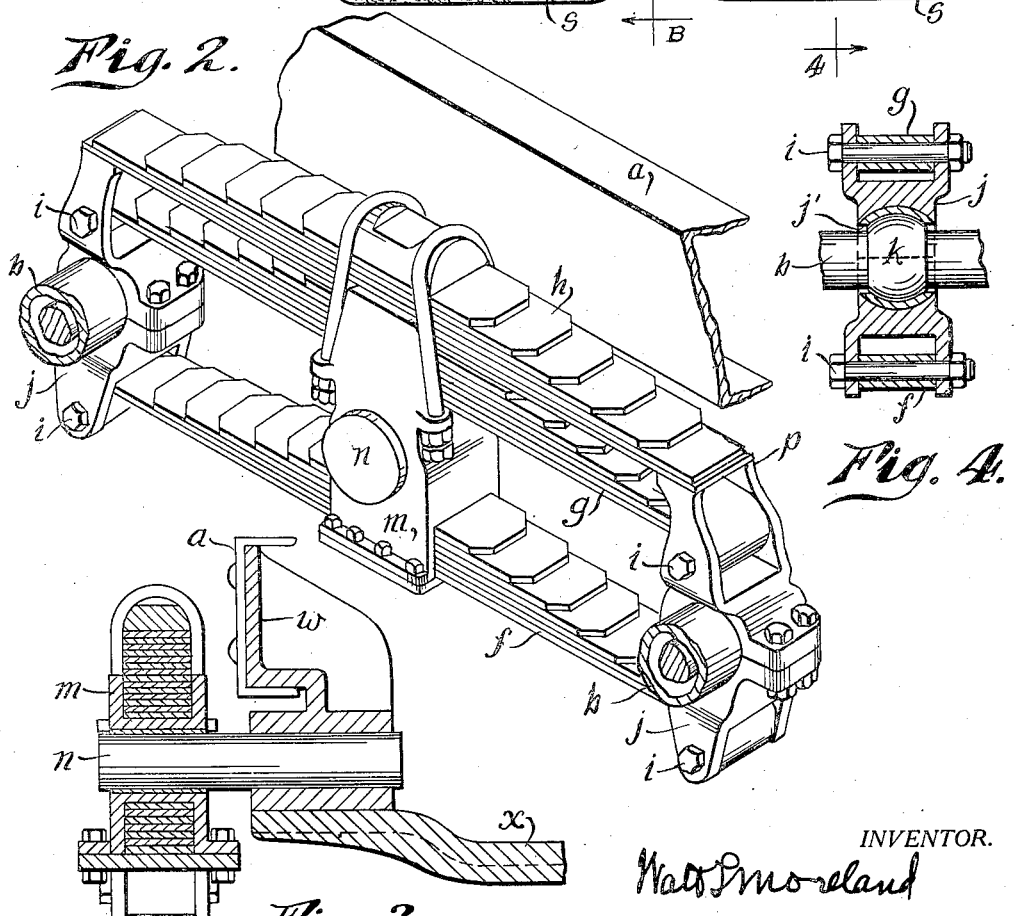
INVENTOR.
Walt Moreland Patented Jan. 14, 1930

1,743,373

UNITED STATES PATENT OFFICE

WATT L. MORELAND, OF LOS ANGELES, CALIFORNIA, ASSIGNOR TO MORELAND MOTOR TRUCK COMPANY, OF BURBANK, CALIFORNIA

VEHICLE SPRING SUSPENSION

Application filed December 14, 1925. Serial No. 75,408.

My invention has for its object new and useful improvements in motor vehicles having a plurality of driving axles and it particularly provides an improved spring suspension which interconnects these axles with each other and with the frame.

This invention also provides flexible or movable connections between the spring suspension and the individual axle housings to relieve the various parts of unnecessary stresses.

It further provides an auxiliary spring to increase the spring capacity at full load while at the same time permitting great spring flexibility at light loads.

In the drawing forming part of this specification like letters denote like parts throughout the various views.

Fig. 1 is a plan view of a portion of a chassis embodying my invention.

Fig. 2 is a side view, partly in perspective, through line AA of Fig. 1.

Fig. 3 is a sectional view through BB of Fig. 1.

Fig. 4 is a sectional view of a bracket supporting the axle housing, through 4—4 of Fig. 1.

In the figures, 'a' represents a portion of the usual frame side member of a motor vehicle. $b$, $b$, are two rear axles, driven by drive shaft $c$ which is driven by the motor and the transmission in the usual manner. $d$ and $e$ represent a cylinder and piston respectively, one of their ends being attached to the rear axles, their other ends being in sliding connection with each other, thereby forming the torque member for withstanding the torque reaction created in said axles. The spring suspension is composed of a lower spring $f$, see Fig. 2, the upper spring $g$, and an auxiliary spring $h$. The ends of springs $f$ and $g$ are held in place by spring bolts $i$ in the usual manner, said spring bolts being supported in brackets $j$, which are provided with bushings $j'$ forming a socket fitting over an enlargement $k$ of the axle housing, as seen from Fig. 4, thereby forming a ball-and-socket joint. At the center, each of said springs is attached to bracket $m$ which is free to rock about, and is pivotally supported by shaft $n$; the other end of $n$ is fixedly supported by frame bracket $w$. $x$ is a cross bar interconnecting the frame brackets on opposite sides of the chassis, one only of such frame brackets being shown in the drawing.

Auxiliary spring $h$ is at its center attached to bracket $m$ while its ends are resting on the upper part $p$ of brackets $j$, when the motor vehicle carries a substantial load. Under light loads the ends of said spring $h$ are not in contact with bracket $j$ but are some distance above it. By using an auxiliary spring it is possible to make the main springs $f$ and $g$ less heavy than would otherwise be required and for this reason a more flexible suspension is obtained at light loads. As is well known, if a main spring is made of sufficient strength to withstand the maximum load which the vehicle has to carry, such spring is not sensitive at light loads. By providing an auxiliary spring as shown, the suspension is sensitive under light loads as well as under heavy loads.

In operation, the propeller shaft $c$, coming from the transmission, drives the gears in the axle housings in the usual manner, both axles being interconnected by short propeller shaft $q$.

$v$ denotes universal joints interposed in the propeller shaft. Wheels $s$ are driven by the live axles located within said axle housings, in the usual manner. When the motor vehicle is in operation and the wheels ride over inequalities on the road, there is a certain amount of motion between ball $k$ of the axle housing $b$ and bushing $j'$ of brackets $j$, while the spring bracket $m$ will rock about shaft $n$, thereby giving increased flexibility to the entire construction.

When the springs are flexed more or less, owing to an increase or decrease in the load, the distance between the axle housings will slightly vary and there will be a slight movement between cylinder $d$ and piston $e$ forming the torque member. In the event that one wheel should ride over an obstruction, the axle end attached to said wheel will rise and this will cause a concentric motion between $e$ and $d$.

By means of the two-piece torque member, the ball-and-socket connection between axle housings and springs, the swivel action between the centers of the springs and the shaft $n$ supported by the frame bracket, the two main springs interconnecting the two driving axles and the auxiliary spring acting in combination therewith, an exceptionally flexible axle suspension is obtained with a minimum of unsprung weight, which, as is well known, contributes toward easy riding qualities.

Having now described my invention, what I claim as new and desire to protect by Letters Patent is:

1. In a motor vehicle, a plurality of axle housings, said axle housings interconnected by a plurality of springs, two-part brackets universally connected to the axle housings, pivotal connections between the ends of the springs to the brackets above and below the axle.

2. In a motor vehicle, a plurality of axle housings, said axle housings interconnected by a plurality of springs, two-part brackets universally connected to the axle housings, pivotal connections between the ends of the springs to the brackets above and below the axle, an upward extension on each of the brackets and an auxiliary spring the ends of which engage said extensions when the main springs flex beyond a certain limit.

3. In a motor vehicle, a pair of axle housings, said axle housings interconnected by a pair of springs, brackets universally connected to the axle housings, pivotal connection between the ends of the springs to said brackets above and below the axle, a center spring bracket rigidly connected to the springs and holding them in spaced relation with each other, said spring bracket in pivotal connection with a stationary member of the frame.

4. In a motor vehicle, a pair of axle housings, said axle housings interconnected by a pair of springs, brackets universally connected to the axle housings, pivotal connection between the ends of the springs to said brackets above and below the axle, a center spring bracket rigidly connected to the springs and holding them in spaced relation with each other, said spring bracket in pivotal connection with a stationary member of the frame, an auxiliary spring attached to the center bracket, the ends of said auxiliary spring engaging the first mentioned brackets when the main springs flex beyond a certain limit.

WATT L. MORELAND.